United States Patent
Shimoda

(10) Patent No.: US 9,249,279 B2
(45) Date of Patent: Feb. 2, 2016

(54) FUEL RESISTANT RESIN MOLDED BODY

(71) Applicant: Polyplastics Co., Ltd., Tokyo (JP)

(72) Inventor: Akihide Shimoda, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 0 days.

(21) Appl. No.: 14/360,919

(22) PCT Filed: Oct. 1, 2012

(86) PCT No.: PCT/JP2012/075403
§ 371 (c)(1),
(2) Date: May 27, 2014

(87) PCT Pub. No.: WO2013/080649
PCT Pub. Date: Jun. 6, 2013

(65) Prior Publication Data
US 2015/0166768 A1    Jun. 18, 2015

(30) Foreign Application Priority Data
Nov. 28, 2011 (JP) .................. 2011-258992

(51) Int. Cl.
*C08K 5/34* (2006.01)
*C08G 18/80* (2006.01)
*C08L 61/02* (2006.01)
*C08K 5/3492* (2006.01)
*C08K 5/098* (2006.01)
*C08L 59/00* (2006.01)
*C08L 59/04* (2006.01)
*B29C 47/00* (2006.01)
*B29K 59/00* (2006.01)

(52) U.S. Cl.
CPC ......... *C08K 5/34924* (2013.01); *B29C 47/0004* (2013.01); *B29C 47/0054* (2013.01); *C08K 5/098* (2013.01); *C08L 59/00* (2013.01); *C08L 59/04* (2013.01); *B29K 2059/00* (2013.01); *B29K 2995/0068* (2013.01)

(58) Field of Classification Search
None
See application file for complete search history.

(56) References Cited

U.S. PATENT DOCUMENTS

2007/0276070 A1   11/2007  Kim et al.
2009/0143506 A1*  6/2009   Harashina ...................... 524/91

FOREIGN PATENT DOCUMENTS

| CN | 88101715 A | 11/1988 |
|----|------------|---------|
| EP | 0855424 A1 | 7/1998  |
| EP | 2065434 A2 | 6/2009  |
| EP | 0289142 A2 | 12/2014 |
| JP | H07-228752 A | 8/1995 |
| JP | 2007-515539 A | 6/2007 |
| JP | 2010-031200 A | 2/2010 |
| WO | WO02/088240 A1 | 11/2002 |
| WO | WO2005/061618 A1 | 7/2005 |

OTHER PUBLICATIONS

Machine Translation of Shimoda et al. JP 2010-031200 pp. 1-13.*
First Office Action issued to CN Application No. 201280058083.9, mailed Dec. 3, 2014.
Extended European search report dated Jun. 15, 2015 in European Application No. 12852981.5.

* cited by examiner

*Primary Examiner* — Susannah Chung
*Assistant Examiner* — Robert T Butcher
(74) *Attorney, Agent, or Firm* — Knobbe, Martens, Olson & Bear, LLP

(57) ABSTRACT

A polyacetal resin composition, contains a polyacetal resin, a hindered phenol antioxidant represented by a specific general formula and a fatty acid calcium salt, which can be molded. The content of the hindered phenol antioxidant in the polyacetal resin composition is from 0.05 part by mass to 1.0 part by mass (inclusive) relative to 100 parts by mass of the polyacetal resin, and the content of the fatty acid calcium salt in the polyacetal resin composition is from 0.01 part by mass to 2.0 parts by mass (inclusive) relative to 100 parts by mass of the polyacetal resin.

9 Claims, No Drawings

FUEL RESISTANT RESIN MOLDED BODY

TECHNICAL FIELD

The present invention relates to a fuel-resistant resin plastic body comprising a polyacetal resin composition.

BACKGROUND ART

A polyacetal resin, which is excellent in mechanical properties, thermal properties, electrical properties, slidability, moldability and the like, is widely used mainly in electrical devices, automotive parts, precision machinery components and the like as a structural material and a mechanism component. As a polyacetal resin is used in increasingly broader fields, required properties tend to become more advanced, complicated and specialized.

For example, in the field of automotive parts, excellent fuel-resistance may be required. A polyacetal resin has excellent fuel-resistance among other thermoplastic resins, and used in large components such as those directly contacting with a fuel oil, for example, a fuel supply unit and the like represented by a fuel pump module.

Moreover, a method of further improving the fuel-resistance of a resin molded body manufactured with a polyacetal resin has been explored. For example, Patent Document 1 discloses a polyacetal resin composition having excellent fuel-resistance even in severe environments.

Patent Document 1: Japanese Unexamined Patent Application

DISCLOSURE OF THE INVENTION

Problems to be Solved by the Invention

The fuel-resistance according to Patent Document 1 is to an extent where immersion in a fuel oil at 100° C. for 1000 hours does not cause a problem.

However, a higher fuel-resistance is desired for a resin molded body comprising a polyacetal resin composition. There has been a demand for a fuel-resistant resin plastic body which does not deteriorate even when immersed in a fuel oil at a temperature higher than that given in Document 1 for a longer period of time.

The present invention is made in order to solve the above problem. An object of the present invention is to provide a fuel-resistant resin plastic body which does not substantially deteriorate even when immersed in a high-temperature fuel oil for a long period of time.

Means for Solving the Problems

The present inventors have conducted extensive studies in order to solve the above problem. As a result, the present inventors have found that a resin molded body comprising a polyacetal resin composition comprising a polyacetal resin, a specific hindered phenol antioxidant and a fatty acid calcium salt forms a fuel-resistant resin plastic body which does not substantially deteriorate even when immersed in a high-temperature fuel oil for a long period of time. Then the present invention has been completed. More specifically, the present invention provides the followings.

(1) A fuel-resistant resin plastic body which directly contacts with a fuel oil during use, constituted from a polyacetal resin composition comprising a polyacetal resin, a hindered phenol antioxidant shown by the following formula (I) below and a fatty acid calcium salt, wherein in the polyacetal resin composition, the content of the hindered phenol antioxidant is from 0.05 parts by weight to 1.0 parts by weight with respect to 100 parts by weight of the polyacetal resin, and in the polyacetal resin composition, the content of the fatty acid calcium salt is from 0.01 parts by weight to 2.0 parts by weight with respect to 100 parts by weight of the polyacetal resin.

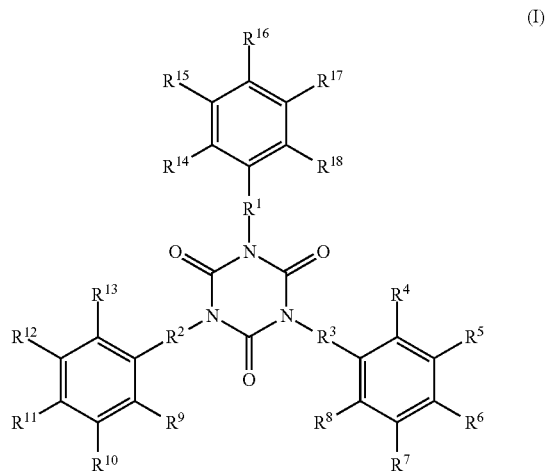

(In the general formula (I), $R^1$, $R^2$ and $R^3$ are alkylene groups having a carbon number of 1 to 4, $R^4$, $R^5$, $R^6$, $R^7$ and $R^8$ are any of a hydroxyl group, an alkyl group having a carbon number of 1 to 7 or a hydrogen atom, and at least one is a hydroxyl group, and at least one is an alkyl group having a carbon number of 3 to 7, $R^9$, $R^{10}$, $R^{11}$, $R^{12}$ and $R^{13}$ are any of a hydroxyl group, an alkyl group having a carbon number of 1 to 7 or a hydrogen atom, and at least one is a hydroxyl group, and at least one is an alkyl group having a carbon number of 3 to 7, $R^{14}$, $R^{15}$, $R^{16}$, $R^{17}$ and $R^{18}$ are any of a hydroxyl group, an alkyl group having a carbon number of 1 to 7 or a hydrogen atom, and at least one is a hydroxyl group, and at least one is an alkyl group having a carbon number of 3 to 7.)

(2) The fuel-resistant resin plastic body according to (1), wherein the hindered phenol antioxidant is tris-(3,5-di-t-butyl-4-hydroxybenzyl)-isocyanurate or 1,3,5-tris(4-t-butyl-3-hydroxy-2,6-dimethylbenzyl)isocyanuric acid.

Effects of the Invention

The fuel-resistant resin plastic body according to the present invention does not substantially deteriorate even when immersed in a high-temperature fuel oil for a long period of time.

PREFERRED MODE FOR CARRYING OUT THE INVENTION

Below, embodiments of the present invention will be described. It should be noted that the present invention shall not be limited to the following embodiments.

The fuel-resistant resin plastic body according to the present invention comprises a polyacetal resin composition comprising a polyacetal resin, a specific hindered phenol antioxidant and a fatty acid calcium salt. The fuel-resistance of a molded body obtained by molding a polyacetal resin composition can be dramatically enhanced by combining a polyacetal resin, a specific hindered phenol antioxidant and a fatty acid calcium salt.

Polyacetal Resin

There is no particular limitation for the polyacetal resin as long as the object of the present invention is not impaired, and it may be appropriately selected from polyacetal resins conventionally used in various applications and used.

Polyacetal resins include polyacetal a homopolymer having only an oxymethylene group (—$CH_2O$—) as a constitutional unit; and a polyacetal copolymer containing another comonomer unit as a constitutional unit in addition to an oxymethylene group. Copolymer units in copolymers include oxy C2-6 alkylene units (for example, oxy C2-4 alkylene units such as an oxyethylene group (—$CH_2CH_2O$—), an oxypropylene group and an oxytetramethylene group). There is no particular limitation for the content of a comonomer unit, but it can be selected from the following ranges: for example, about 0.01 to 30 mol %, preferably about 0.03 to 20 mol %, more preferably about 0.03 to 15 mol % relative to the total constitutional units in a polyacetal resin.

In a case where the polyacetal resin is a polyacetal copolymer, it may be a binary copolymer, a ternary terpolymer or the like. The polyacetal copolymer may be a block copolymer, a graft copolymer or the like in addition to a random copolymer. Further, the polyacetal resin may have a linear structure as well as a branched structure and a cross linked structure. Furthermore, a terminal end of the polyacetal resin may be stabilized through the esterification with, for example, acetic acid, carboxylic acid such as propionic acid or an anhydride thereof.

There is no particular limitation for a melt index of the polyacetal resin, but it is preferably from 2 g/10 min to 30 g/10 min. A melt index of 2 g/10 min or more is preferred because a molded body can be well molded while a melt index of 30 g/10 min or less is preferred because a molded body which contacts with a fuel will not easily be damaged by creep and the like. It should be noted that the melt index refers to a melt index as measured under the conditions of a load of 2160 g at 190° C.

Methods of manufacturing a polyacetal resin include the followings. A homopolymer may be manufactured by polymerizing formaldehyde or a cyclic oligomer thereof (for example, trioxane) as a monomer. Further, using this as a main monomer, a copolymer may be manufactured by copolymerizing cyclic ether or cyclic formal such as ethylene oxide, propylene oxide, 1,3-dioxolane, 1,3-dioxane, diethylene glycol formal and 1,4-butanediol formal as comonomer.

The polyacetal resin composition is a resin composite having a polyacetal resin as a main component. The content of a polyacetal resin in the polyacetal resin composition is preferably 80 mass % or more, more preferably 90 mass % or more. Hindered phenol antioxidant The hindered phenol antioxidant is represented by the following general formula (I).

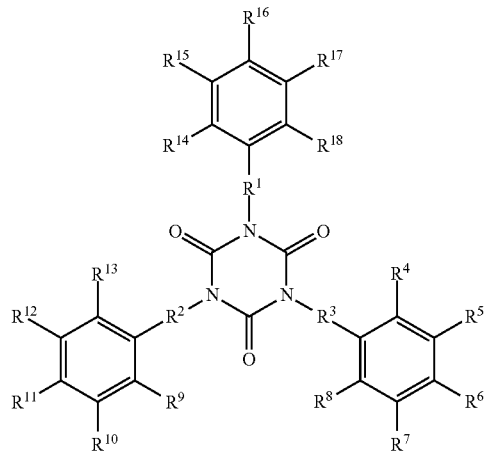

In the general formula (I), $R^1$, $R^2$ and $R^3$ are alkylene groups having a carbon number of 1 to 4, they can include, for example, a methylene group, an ethylene group, a propylene group, i-propylene group, a butylene group and i-butylene group. In the present invention, $R^1$, $R^2$ and $R^3$ are relatively short, and do not have an ester bond. In a case where they have an ester bond, sufficient fuel-resistance may not be conferred on a resin molded body. Further, among these alkylene groups, a methylene group is preferred, and $R^1$, $R^2$ and $R^3$ are preferably all methylene groups.

$R^4$, $R^5$, $R^6$, $R^7$ and $R^8$ are any of a hydroxyl group, an alkyl group having a carbon number of 1 to 7 or a hydrogen atom, and at least one is a hydroxyl group, and at least one is an alkyl group having a carbon number of 3 to 7. An alkyl group may be linear or branched, or may be cyclic (a cycloalkyl group). Alkyl groups can include, for example, a methyl group, an ethyl group, a propyl group, an i-propyl group, a butyl group, an i-butyl group, a t-butyl group, an s-butyl group, a 3-methylbutyl group, an n-pentyl group, an n-hexyl group, a 2-ethylhexyl group, a heptyl group, a cyclobutyl group, a cyclopentyl group, a cyclohexyl group and the like.

In $R^4$, $R^5$, $R^6$, $R^7$ and $R^8$, a group adjacent to a hydroxyl group is preferably a bulky group. Bulky groups include an i-propyl group, an i-butyl group, a t-butyl group, an s-butyl group, a 3-methylbutyl group, a cyclobutyl group, a cyclopentyl group, a cyclohexyl group and the like.

$R^9$, $R^{10}$, $R^{11}$, $R^{12}$ and $R^{13}$ and $R^{14}$, $R^{15}$, $R^{16}$, $R^{17}$ and $R^{18}$ can be defined in a similar way as $R^4$, $R^5$, $R^6$, $R^7$ and $R^8$. Therefore, their definitions are not repeated.

In the present invention, among the hindered phenol antioxidants represented by the above general formula (I), tris-(3,5-di-t-butyl-4-hydroxybenzyl)-isocyanurate or 1,3,5-tris (4-t-butyl-3-hydroxy-2,6-dimethylbenzyl)isocyanuric acid is most preferably used.

The content of a hindered phenol antioxidant in the polyacetal resin composition is from 0.05 parts by weight to 1.0 parts by weight relative to 100 parts by weight of the polyacetal resin. A content of the hindered phenol antioxidant of 0.05 parts by weight or more is preferred because resin degradation at the time of manufacturing a molded body can be suppressed, and the thermal resistance and fuel-resistance of the molded body will be increased. A content of 1.0 parts by weight or less is preferred because elution from the molded body can be suppressed. A more preferred content is from 0.1 parts by weight to 0.6 parts by weight.

Fatty Acid Calcium Salt

A fatty acid in a fatty acid calcium salt may be a saturated fatty acid, or may be an unsaturated fatty acid. Such fatty acids can include monovalent or divalent fatty acids having a carbon number of 10 or more, for example, monovalent saturated fatty acids having a carbon number of 10 or more [C10-34 saturated fatty acids (preferably C10-30 saturated fatty acids) and the like such as capric acid, lauric acid, myristic acid, pentadecylic acid, palmitic acid, stearic acid, arachic acid, behenic acid and montanic acid], monovalent unsaturated fatty acids having a carbon number of 10 or more [C10-34 unsaturated fatty acids (preferably C10-30 unsaturated fatty acid) and the like such as oleic acid, linolic acid, linolenic acid, arachidonic acid and erucic acid], divalent fatty acids having a carbon number of 10 or more (dibasic fatty acids) [divalent C10-30 saturated fatty acids (preferably C10-20 divalent saturated fatty acids) such as sebacic acid, dodecanoic acid, tetradecanoic acid, thapsia acid, divalent C10-30 unsaturated fatty acids (preferably divalent C10-20 unsaturated fatty acids) and the like such as decenedioic acid and dodecenedioic acid]. Further, the above fatty acids include fatty acids in which one or more hydrogen atoms thereof are substituted with a substituent such as a hydroxyl group to give one or more hydroxyl groups therein (for example, hydroxy saturated C10-26 fatty acids such as 12-hydroxystearic acid and the like). In the present invention, particularly preferred fatty acid calcium salts are calcium stearate and 12-hydroxystearic acid calcium.

The content of a fatty acid calcium salt in the polyacetal resin composition is from 0.01 parts by weight to 2.0 parts by weight relative to 100 parts by weight of the polyacetal resin. A content of the fatty acid calcium salt of 0.01 parts by weight or more is preferred because the thermal resistance and fuel-resistance of a molded body is improved. A content of 2.0 parts by weight or less is preferred because less significant discoloration occurs in the molded body. The above content of a preferred fatty acid calcium salt is from 0.3 parts by mass to 1.2 parts by mass.

Other Components

Various known stabilizers and additives can be further added to the polyacetal resin composition as long as they are in the range where the effect of the present invention is not impaired. They include, for example, various colorants, parting agents, nucleating agents, antistatic agents, other surfactants, heterologous polymers and the like.

Method of Preparing Polyacetal Resin Composition

There is no particular limitation for the method of preparing a polyacetal resin composition, and any methods can be used as long as the above components can be included in the above specific mixing ratio. For example, it can be easily prepared by commonly used methods known as methods of preparing a resin composition. Specifically, they include a method comprising: mixing each component to be included in a composition, and then melt-kneading the mixture with a uniaxial or biaxial extruder for extrusion; and cutting it into pellets of the composition.

Further, pellets having different compositions (master batch) are prepared, and adjusted so that two or more pellets as a whole comprise a polyacetal resin, the above hindered phenol antioxidant and the above fatty acid calcium salt in the above specific mixing ratio.

Method of Manufacturing Fuel-Resistant Resin Plastic Body

The fuel-resistant resin plastic body according to the present invention is prepared by molding the above polyacetal resin composition by a common molding method. Common molding methods can include the injection molding method, the extrusion molding method, the blow molding method and the like. Molding conditions and molding methods are appropriately selected depending on material properties, a form of a molded body and the like.

Fuel-Resistant Resin Plastic Body

The fuel-resistant resin plastic body is a molded body which directly contacts with a fuel oil during use. For example, a tube for fuel tubing, a connector for fuel tubing, a fuel tank center seal, a fuel tank cap seal, a canister, a tank, an injector and the like can be mentioned.

Further, fuel oils include gasoline, light oil, heavy oil, kerosene, GTL light oil and the like. The fuel-resistant resin plastic body according to the present invention has a high fuel-resistance particularly against light oil.

EXAMPLES

Below, the present invention will be described in detail with reference to Examples. However, the present invention shall not be limited to these Examples.

Materials

[Polyacetal Resin]

Polyacetal resin: a polyacetal copolymer prepared by copolymerizing 96.7 mass % of trioxane and 3.3 mass % of 1,3-dioxolane, having a melt index (as measured at 190° C. with a load of 2160 g) of 9 g/10 min.

[Hindered Phenol Antioxidant]

Hindered phenol antioxidant 1: tris-(3,5-di-t-butyl-4-hydroxybenzyl)-isocyanurate (Irganox 3114, BASF A.G.)

Hindered phenol antioxidant 2: 1,3,5-tris(4-t-butyl-3-hydroxy-2,6-dimethylbenzyl)isocyanuric acid (Cyanox CY-1790, Cytech, Inc.)

Hindered phenol antioxidant 3: tetrakis[methylene 3 (3,5 di-t-butyl 4-hydroxyphenyl)propionate]methane (Irganox 1010, BASF A.G.)

[Alkaline Earth Metal Compound]

Alkaline earth metal compound 1: calcium stearate

Alkaline earth metal compound 2: 12-hydroxystearic acid calcium

Alkaline earth metal compound 3: calcium carbonate

Alkaline earth metal compound 4: magnesium hydroxide

Preparation of Polyacetal Resin Composition

A hindered phenol antioxidant and an alkaline earth metal compound were added to and mixed with a polyacetal resin in a ratio shown in Table 1 (numerical values are in a unit of parts by weight), and melt-kneaded with a biaxial extruder to prepare a composition in the form of a pellet.

Manufacture of Molded Body

Subsequently, using the pellets, ASTM No. 1 dumbbell test pieces were prepared by the injection molding. Tensile property was measured for the molded test pieces. Specifically, tensile elongation and tensile strength were measured according to ASTM D-638. Results form the measurements are shown in Table 1.

Fuel-Resistance Evaluation

For evaluating fuel-resistance, a dumbbell test piece was immersed in JIS No. 2 light oil at 120° C., and taken out after 70 days to measure the test piece for a tensile property, and then a physical property retention rate was calculated. Since deterioration starts at a surface of the test piece due to immersion in light oil, it is the tensile elongation that changes most sensitively. The higher is the tensile elongation retention rate after treatment, the better the fuel-resistance is.

TABLE 1

|  |  | Example | | | | Comparative Example | | | | |
| --- | --- | --- | --- | --- | --- | --- | --- | --- | --- | --- |
|  |  | 1 | 2 | 3 | 4 | 1 | 2 | 3 | 4 | 5 |
| Polyacetal resin | | 100 | 100 | 100 | 100 | 100 | 100 | 100 | 100 | 100 |
| Hindered phenol antioxidant 1 | | 0.2 | 0.5 | | | 0.5 | 0.5 | | | |
| Hindered phenol antioxidant 2 | | | | 0.5 | 0.5 | | | | | |
| Hindered phenol antioxidant 3 | | | | | | | | 0.5 | 0.5 | 0.5 |
| Alkaline earth metal compound 1 | | 0.5 | 1 | 0.5 | | | | 0.5 | | |
| Alkaline earth metal compound 2 | | | | | 0.5 | | | | | |
| Alkaline earth metal compound 3 | | | | | | 0.5 | | | 0.5 | |
| Alkaline earth metal compound 4 | | | | | | | 0.5 | | | 0.5 |
| Initial physical properties | Tensile strength (MPa) | 58 | 58 | 59 | 58 | 59 | 60 | 59 | 58 | 60 |
| | Tensile elongation (%) | 65 | 68 | 66 | 70 | 50 | 55 | 60 | 55 | 54 |
| Physical properties after treatment | Tensile strength retention rate (%) | 100 | 100 | 100 | 100 | 98 | 98 | 95 | 93 | 90 |
| | Tensile elongatton retention rate (%) | 102 | 109 | 101 | 106 | 80 | 76 | 45 | 41 | 33 |

Table 1 shows that the fuel-resistance of a molded body prepared by molding a polyacetal resin composition can be dramatically improved by combining a polyacetal resin, a specific hindered phenol antioxidant and a fatty acid calcium salt.

The invention claimed is:

1. A fuel-resistant resin plastic body comprising:
a polyacetal resin composition comprising a polyacetal resin, a hindered phenol antioxidant and a fatty acid calcium salt,
wherein the polyacetal resin is a copolymer containing a monomer having an oxymethylene group as a constitutional unit and an additional constitutional unit,
the additional constitutional unit is an oxy C2-6 alkylene unit selected from the group consisting of an oxyethylene group, an oxypropylene group and an oxytetramethylene group,
the hindered phenol antioxidant is tris-(3,5-di-t-butyl-4-hydroxybenzyl)-isocyanurate or 1,3,5-tris(4-t-butyl-3-hydroxy-2,6,-dimethylbenzyl)isocyanuric acid,
the fatty acid calcium salt is a stearate or stearic acid derivative,
in the polyacetal resin composition, the content of the hindered phenol antioxidant is from 0.1 parts by weight to 0.6 parts weight with respect to 100 parts by weight of the polyacetal resin, and
in the polyacetal resin composition, the content of the fatty acid calcium salt is from 0.01 parts by weight to 2.0 parts by weight with respect to 100 parts by weight of the polyacetal resin.

2. The fuel-resistant resin plastic body according to claim 1, wherein the polyacetal resin is a homopolymer having only an oxymethylene group as a constitutional unit.

3. The fuel-resistant resin plastic body according to claim 1, wherein the additional constitutional unit is present in an amount from about 0.01 to 30 mol %.

4. The fuel-resistant resin plastic body according to claim 1, wherein the polyacetal resin is a copolymer selected from the group consisting of a binary copolymer and a ternary terpolymer.

5. The fuel-resistant resin plastic body according to claim 1, wherein the polyacetal resin is a copolymer selected from the group consisting of a block copolymer, a graft copolymer and a random copolymer.

6. The fuel-resistant resin plastic body according to claim 1, wherein the polyacetal resin has a structure selected from the group consisting of a linear structure, a branched structure and a cross-linked structure.

7. The A fuel-resistant resin plastic body according to claim 1, wherein the polyacetal resin has a terminal end stabilized through esterification.

8. The fuel-resistant resin plastic body according to claim 1, wherein a tensile elongation retention rate of the polyacetal resin composition according to ASTM D-638 is at least 101% to no more than 109%, when immersing an ASTM No. 1 dumbbell test piece of the same composition as the polyacetal resin composition into JIS No. 2 light oil at 120° C., then taking the test piece out after 70 days.

9. A method of using a resin plastic body, the method comprising
directly contacting the resin plastic body with a fuel oil, wherein the resin plastic body comprises a polyacetal resin composition, wherein the polyacetal resin composition comprises a polyacetal resin, a hindered phenol antioxidant and a fatty acid calcium salt,
wherein the polyacetal resin is a copolymer containing a monomer having an oxymethylene group as a constitutional unit and an additional constitutional unit,
the additional constitutional unit is an oxy C2-6 alkylene unit selected from the group consisting of an oxyethylene group, an oxypropylene group and an oxytetramethylene group,
the hindered phenol antioxidant is tris-(3,5-di-t-butyl-4-hydroxybenzyl)-isocyanurate or 1,3,5-tris(4-t-butyl-3-hydroxy-2,6,-dimethylbenzyl)isocyanuric acid,
the fatty acid calcium salt is a stearate or stearic acid derivative,
in the polyacetal resin composition, the content of the hindered phenol antioxidant is from 0.1 parts by weight to 0.6 parts by weight with respect to 100 parts by weight of the polyacetal resin, and in the polyacetal resin composition, the content of the fatty acid calcium salt is from 0.01 parts by weight to 2.0 parts by weight with respect to 100 parts by weight of the polyacetal resin.

* * * * *